United States Patent
Tanaka et al.

(10) Patent No.: US 7,961,423 B2
(45) Date of Patent: Jun. 14, 2011

(54) INFORMATION RECORDING APPARATUS

(75) Inventors: Kenji Tanaka, Osaka (JP); Kenichiro Yoshida, Osaka (JP); Sadamu Kuse, Osaka (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 35 days.

(21) Appl. No.: 12/479,120

(22) Filed: Jun. 5, 2009

(65) Prior Publication Data

US 2009/0310251 A1 Dec. 17, 2009

(30) Foreign Application Priority Data

Jun. 12, 2008 (JP) ................. 2008-154157
Jun. 19, 2008 (JP) ................. 2008-160564

(51) Int. Cl.
*G11B 5/584* (2006.01)
(52) U.S. Cl. .................................. 360/77.12
(58) Field of Classification Search ........................ None
See application file for complete search history.

(56) References Cited

U.S. PATENT DOCUMENTS

| | | | | |
|---|---|---|---|---|
| 5,377,227 | A * | 12/1994 | Hurlbut et al. | 375/142 |
| 5,689,384 | A | 11/1997 | Albrecht et al. | |
| 6,021,013 | A | 2/2000 | Albrecht et al. | |
| 6,226,688 | B1 | 5/2001 | Frary | |
| 6,282,051 | B1 * | 8/2001 | Albrecht et al. | 360/75 |
| 7,388,724 | B2 * | 6/2008 | Gillingham et al. | 360/39 |
| 7,529,061 | B2 * | 5/2009 | Bui et al. | 360/77.12 |
| 7,656,602 | B2 * | 2/2010 | Iben et al. | 360/66 |
| 2008/0117543 | A1 * | 5/2008 | Bui et al. | 360/77.12 |

FOREIGN PATENT DOCUMENTS

JP 8-30942 A 2/1996

* cited by examiner

*Primary Examiner* — K. Wong
(74) *Attorney, Agent, or Firm* — Birch, Stewart, Kolasch & Birch, LLP

(57) ABSTRACT

The information recording apparatus of the present invention includes N servo heads. Servo signals outputted respectively from the servo heads are delayed by a delay circuit such that the peaks of the waveforms of the servo signals coincide with each other. The delayed servo signals are added up by an adder. Thus, the output level of the servo signal can be increased by N times and the S/N ratio of the servo signal can be also increased by $\sqrt{N}$ times. As a result, the precision of PES improves and the amount of off-track can be reduced. Therefore, even if a magnetic layer in magnetic tape has a small thickness, it is possible to prevent the decline of the output level of the servo signal and the S/N ratio.

2 Claims, 9 Drawing Sheets

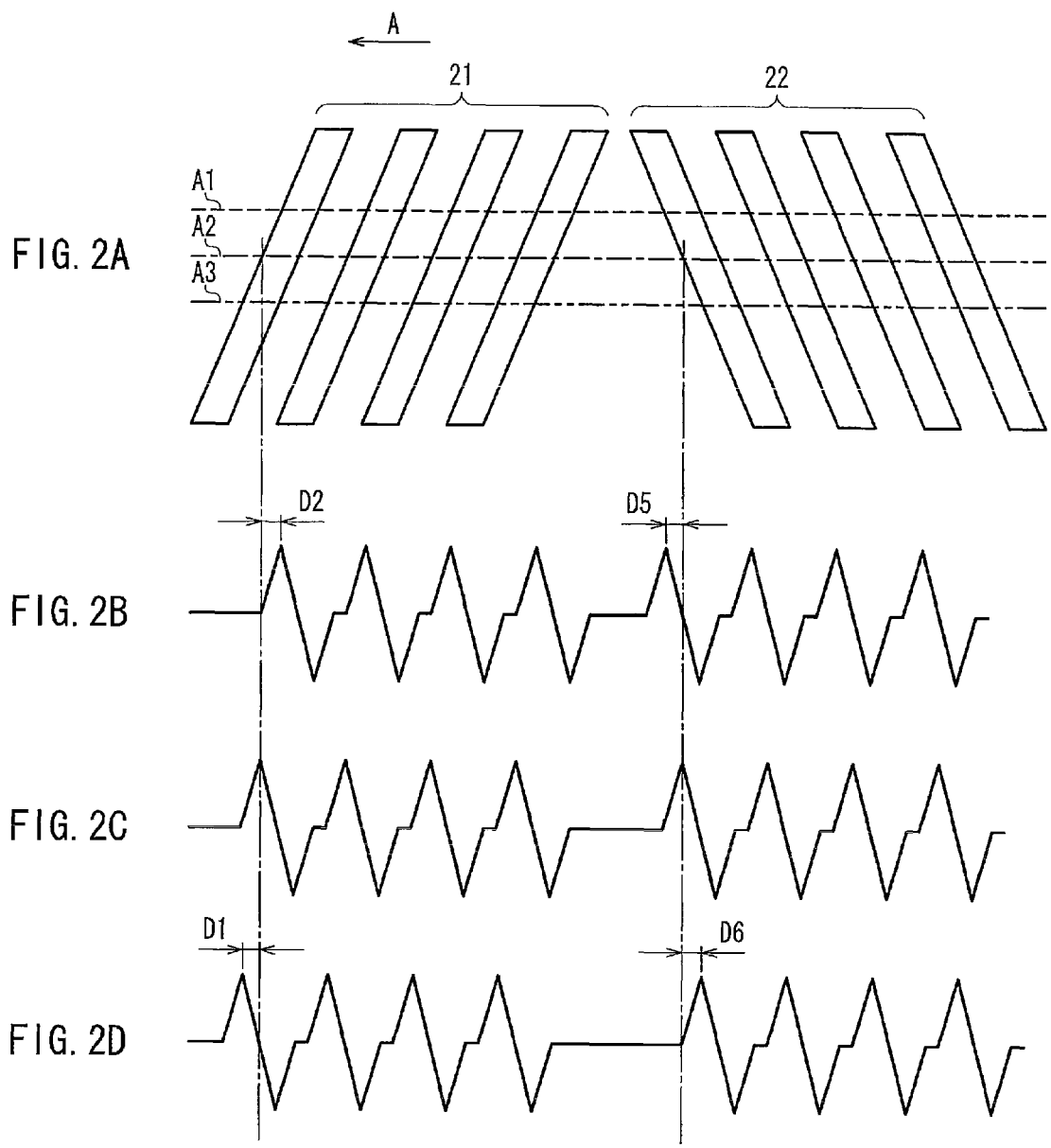

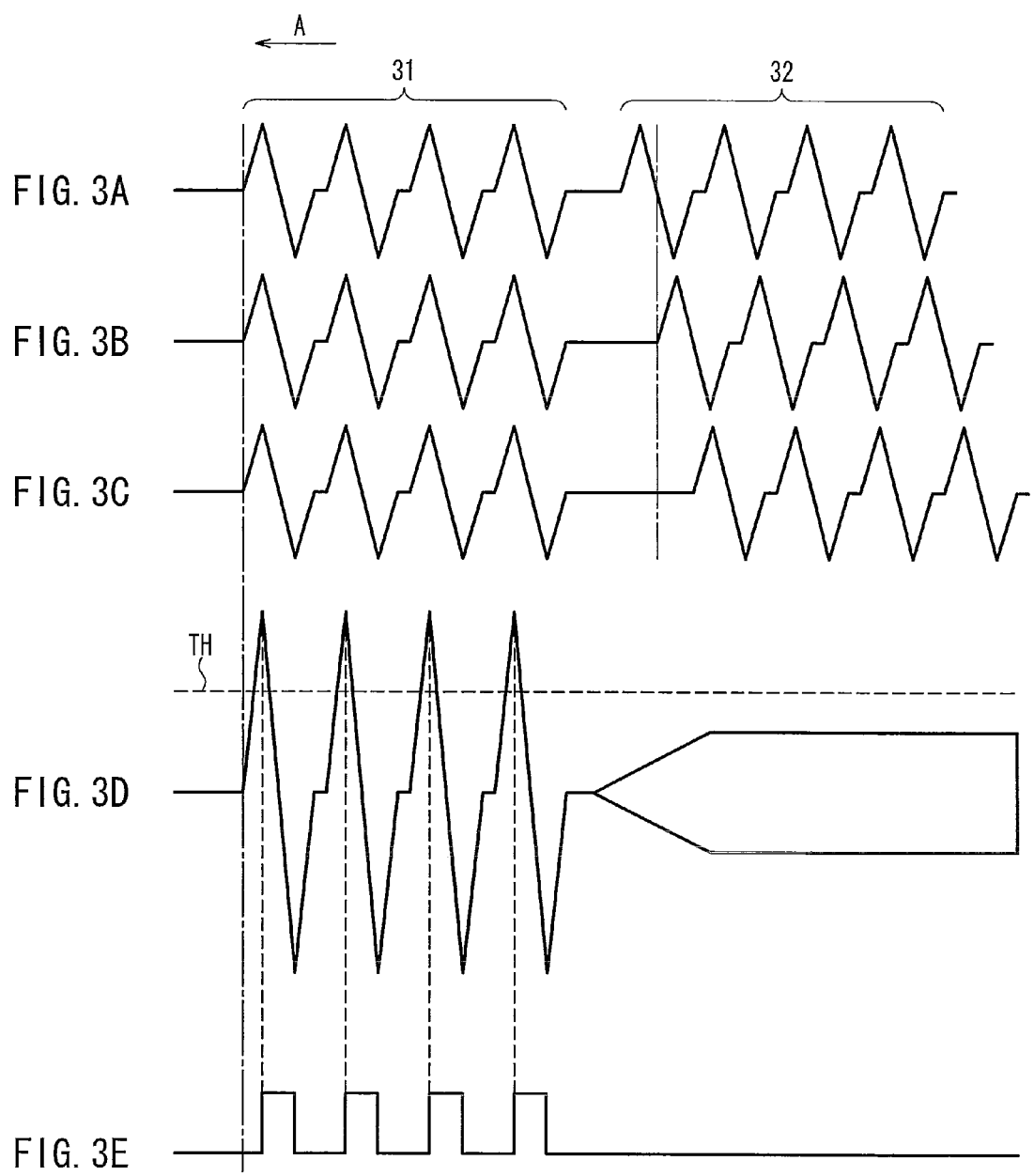

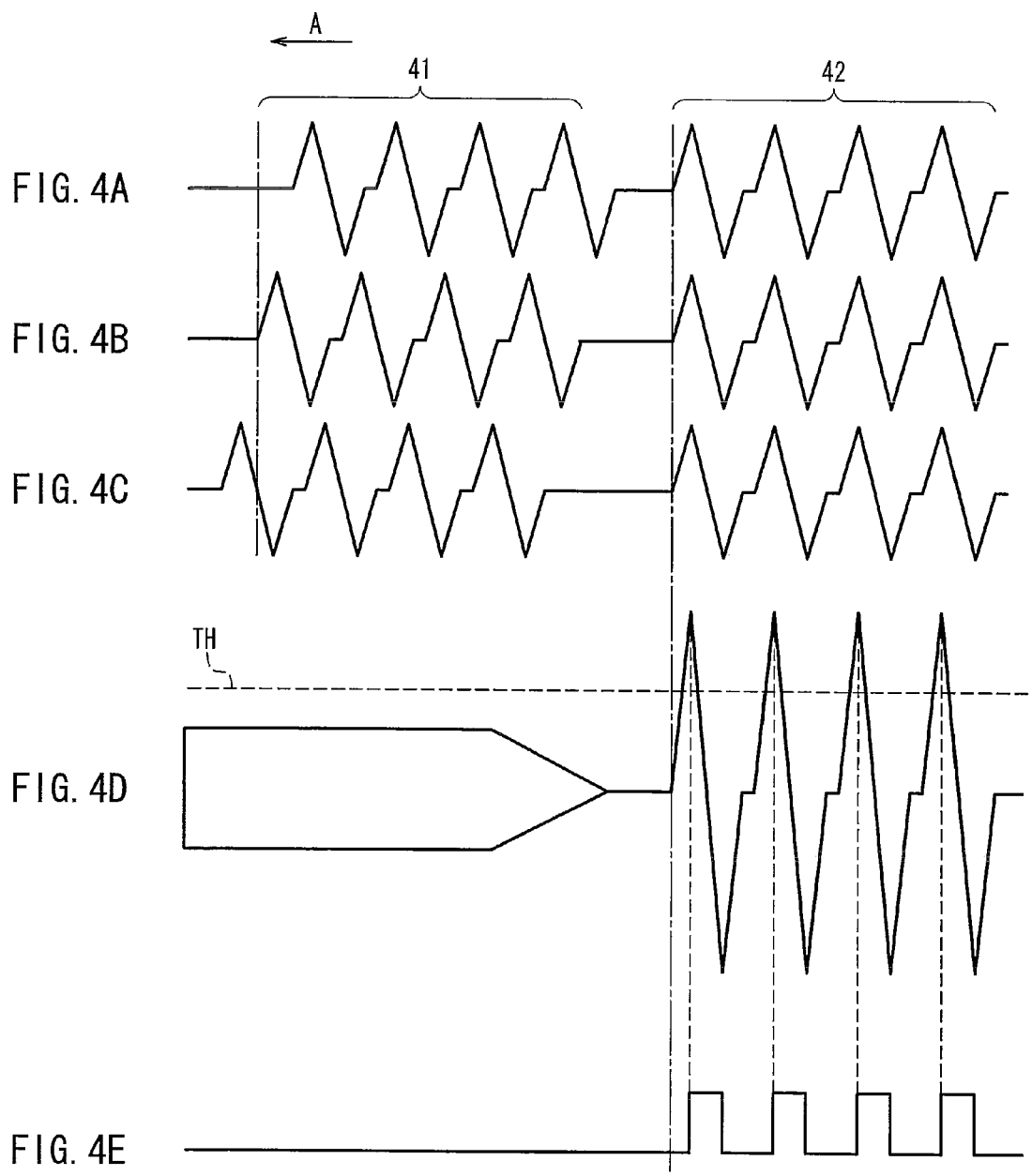

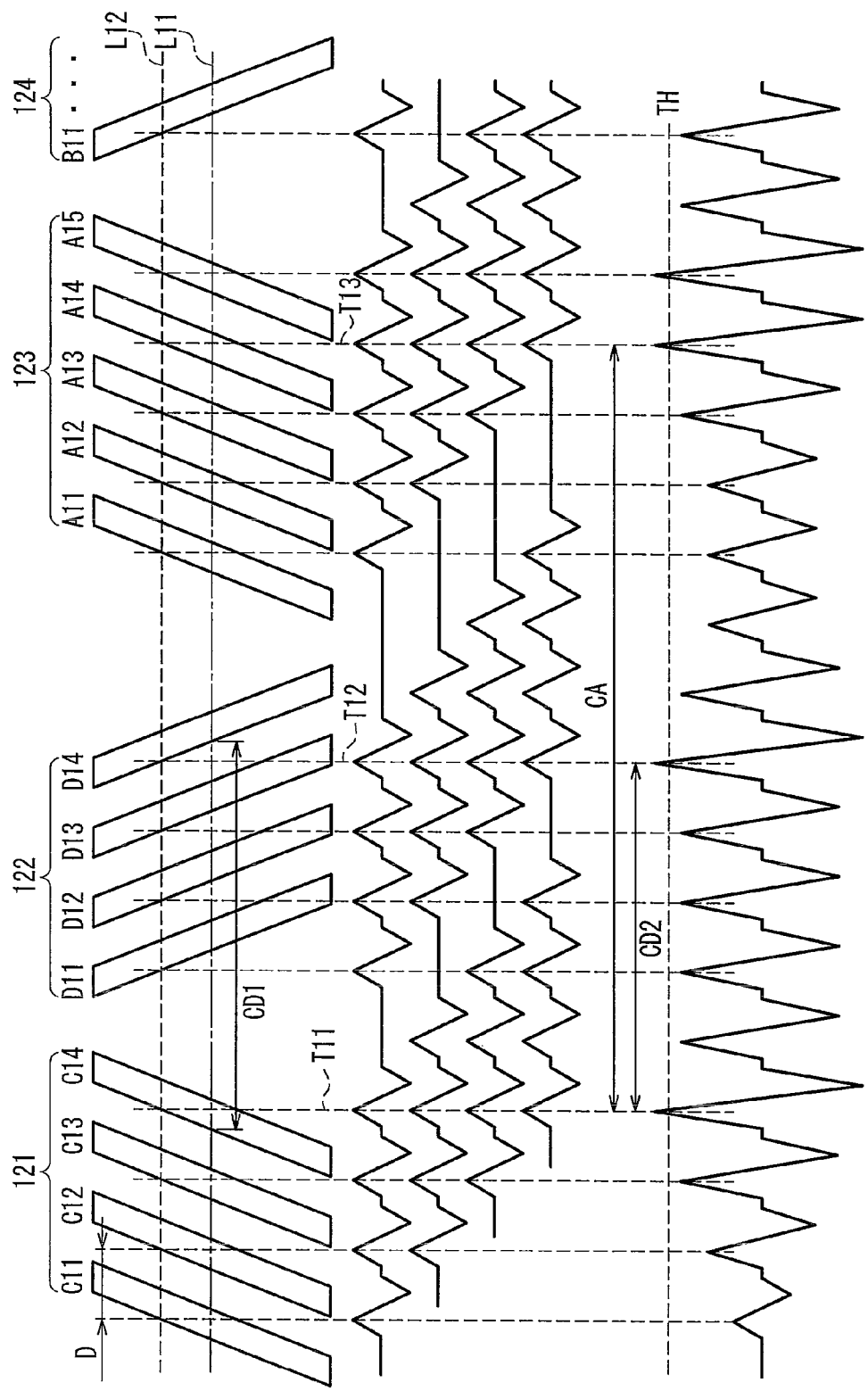

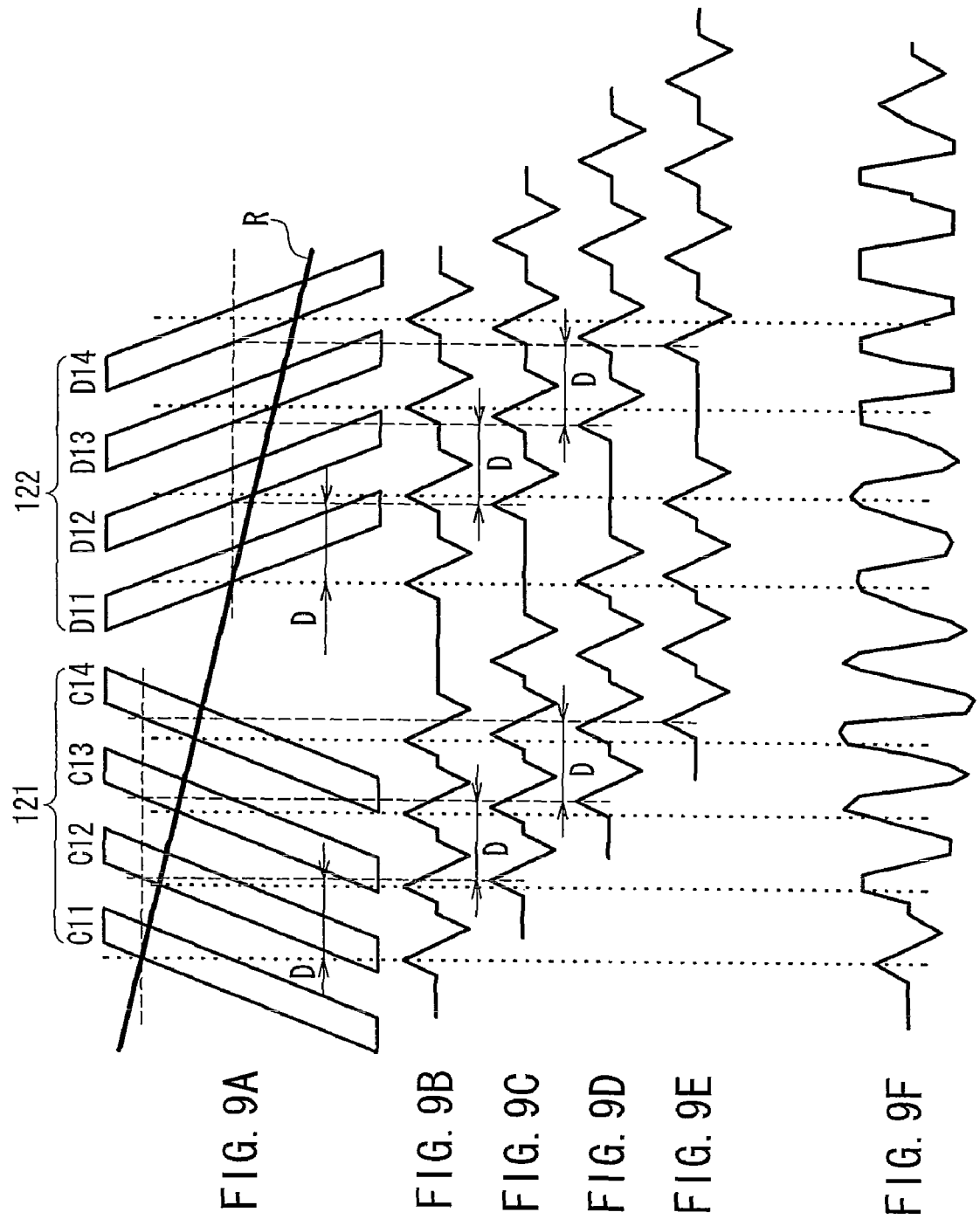

INFORMATION RECORDING APPARATUS

BACKGROUND OF INVENTION

1. Field of the Invention

The present invention relates to an information recording apparatus, such as a computer data storage system, which is capable of recording information on magnetic tape.

2. Description of Related Art

Magnetic tape has a variety of uses. For example, it can be used as audiotape, videotape, computer tape, and the like. In the field of data backup tape in particular, with an increase in the capacity of hard drives to be backed up, magnetic tape cassettes with a recording capacity of several terabites per reel have been commercialized. In order to keep up with a further increase in the capacity of hard drives in the future, an increase in the capacity of backup tape is essential.

Methods of increasing the capacity of magnetic tape include, for example, reducing the thickness of the magnetic tape. According to such a method, the recording capacity can be increased by increasing a per-reel tape length, without increasing the roll diameter of the magnetic tape around the reel.

On the other hand, information recording apparatuses carry out tracking servo control so that a magnetic head can trace a target track of the magnetic tape. Examples of tracking servo systems include a magnetic servo system and an optical servo system. In the magnetic servo system, servo tracking is carried out by magnetically recording servo signals in a magnetic layer of the magnetic tape and magnetically reading the servo signals. In the optical servo system, servo tracking is carried out by forming recessed arrays (servo signals) in a back-coat layer of the magnetic tape using laser irradiation or the like and optically reading the recessed arrays.

When recording data on or reproducing data from the magnetic tape using these servo systems, it is possible to allow the magnetic head to trace the recording track even if the position of the magnetic tape changes in the width direction relative to the magnetic head.

Specifically, first, servo signals recorded on the magnetic tape are read by a servo head. Next, a position error signal (PES) is calculated on the basis of the read-out servo signals. Then, by controlling the position of a magnetic head unit (including the servo head, a data recording head, and a data reproduction head) in the width direction of the magnetic tape based on the calculated PES, the data recording head or the data reproduction head is allowed to trace the target data track. As a result, information can be recorded on the magnetic tape with precision and information recorded on the magnetic tape can be reproduced with precision.

JP H8-30942 A discloses a timing-based servo system. In the timing-based servo system, servo signals are recorded on magnetic tape as a pattern that is inclined with respect to the width direction of the magnetic tape. In the timing-based servo system, the head position is recognized from a time interval between peaks of reproduced waveforms at the time of reproducing the servo signals.

However, in the convention configurations as described above, when the thickness of the magnetic tape is reduced to increase the recording capacity of the magnetic tape, the thickness of the magnetic layer becomes small. Thus, the servo signal output and the signal-to-noise ratio (S/N ratio) decline, and consequently, the precision of tracking servo control drops. For example, since a servo signal in conformity with the Linear Tape Open (LTO) standard has a fairly long wavelength, the servo signal output and the S/N ratio decline when the thickness of the magnetic layer becomes small.

SUMMARY OF THE INVENTION

With the foregoing in mind, it is an object of the present invention to provide an information recording apparatus capable of preventing the decline of the servo signal output and the S/N ratio even when the magnetic layer has a small thickness.

A first information recording apparatus of the present invention is an information recording apparatus capable of carrying out tracking servo control by reading with a servo head servo stripes recorded on magnetic tape with an inclination in a longitudinal direction of the magnetic tape. The first information recording apparatus includes: N servo heads ($N \geq 2$) aligned in a width direction of the magnetic tape; a delay means for delaying N servo signals reproduced by the N servo heads for a predetermined time; an adding means for adding up N servo signals outputted from the delay means; a signal processing means for generating tracking information from a servo signal outputted from the adding means; and a delay time control means for controlling a delay time of the delay means. The delay time control means controls the delay time of the delay means so that peak timings of N servo signals with a time lag reproduced by the N servo heads coincide with each other.

A second information recording apparatus of the present invention is an information recording apparatus capable of carrying out tracking servo control by reading with a servo head servo stripes recorded on magnetic tape with an inclination in a longitudinal direction of the magnetic tape. The second information recording apparatus includes: N delay means for delaying a servo signal reproduced by the servo head for a predetermined time, the N delay means being connected to each other in series; an adding means for adding up the servo signal reproduced by the servo head and N servo signals outputted respectively from the N delay means; a signal processing means for generating tracking information from a servo signal outputted from the adding means; and a delay time control means for controlling a delay time of each of the delay means. The delay time control means controls the delay time of each of the N delay means so that the delay time coincides with a period of the servo stripes.

According to the present invention, the servo signal output and the S/N ratio can be improved even if the thickness of a magnetic layer of a magnetic tape becomes small.

BRIEF DESCRIPTION OF THE DRAWINGS

FIG. 2A is a schematic diagram showing servo stripes. FIGS. 2B to 2D are waveform diagrams showing servo signals outputted from servo heads.

FIGS. 3A to 3C are waveform diagrams showing servo signals outputted from delay circuits. FIG. 3D is a waveform diagram showing a servo signal outputted from an adder. FIG. 3E is a waveform diagram showing a pulse outputted from a signal processing circuit.

FIGS. 4A to 4C are waveform diagrams showing servo signals outputted from the delay circuits. FIG. 4D is a waveform diagram showing a servo signal outputted from the adder. FIG. 4E is a waveform diagram showing a pulse outputted from the signal processing circuit.

FIG. 8A is a schematic diagram showing servo stripes. FIG. 8B is a waveform diagram showing a servo signal outputted from a servo head. FIG. 8C to 8E are waveform diagrams showing servo signals outputted from delay circuits. FIG. 8F is a waveform diagram showing a servo signal outputted from an adder.

FIG. 9A is a schematic diagram showing servo stripes. FIGS. 9B to 9E are waveform diagrams showing servo signals outputted from the servo heads when there is LTM. FIG. 9F is a waveform diagram showing a servo signal outputted from the adder when there is LTM.

DETAILED DESCRIPTION OF THE INVENTION

Embodiment 1

1. Configuration of Information Recording Apparatus

Figure 1:
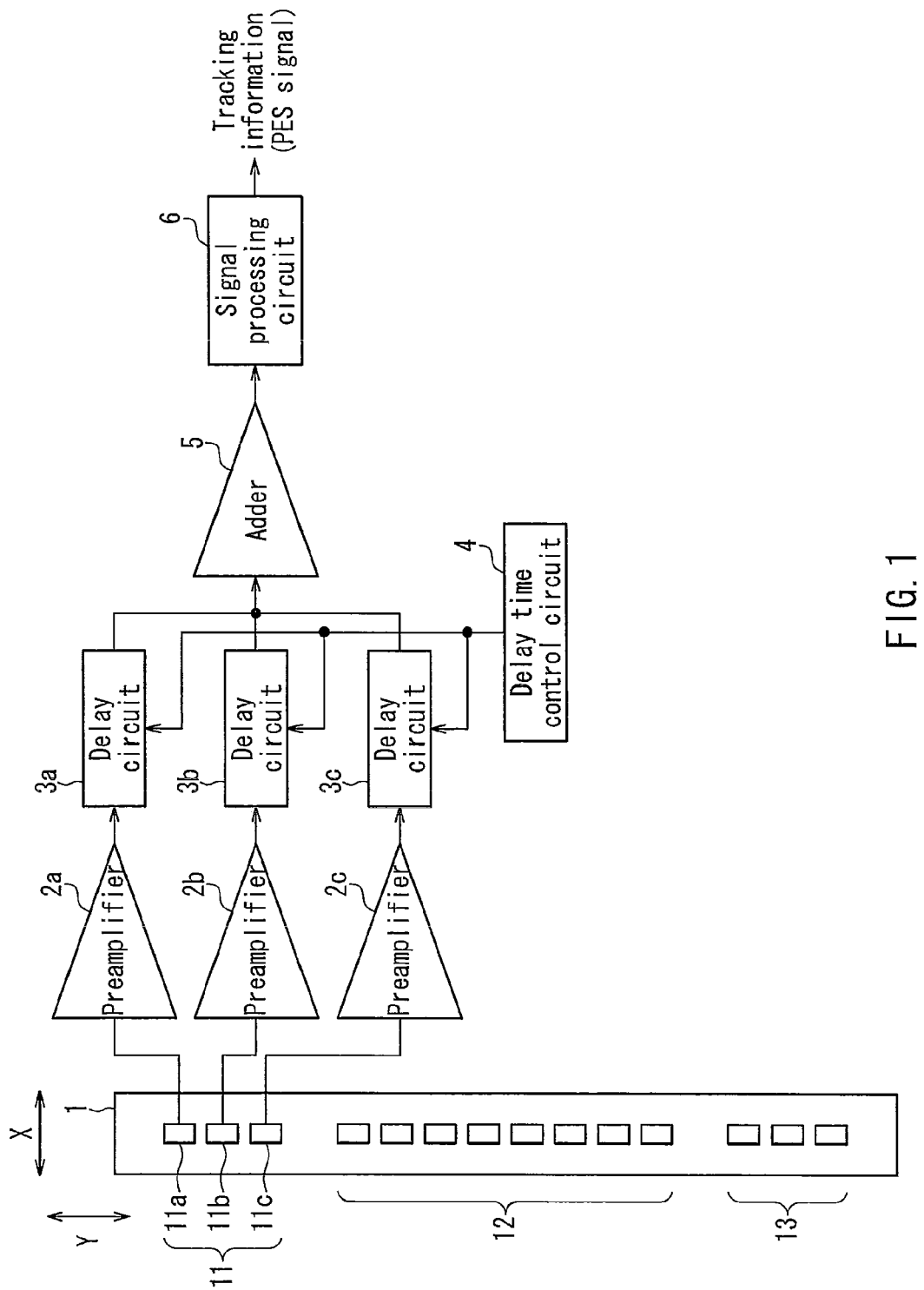
FIG. 1 is a block diagram showing an information recording apparatus according to Embodiment 1.

FIG. 1 is a block diagram showing an information recording apparatus according to Embodiment 1.

In FIG. 1, a head unit 1 is disposed so that it can be moved by an actuator (not shown) in a width direction (the arrow Y direction) of the magnetic tape. When carrying out tracking servo control on the magnetic tape, the head unit 1 is controlled to move in the width direction (the arrow Y direction) of the magnetic tape so that data heads included in a data head group 12 can trace a predetermined data track. The head unit 1 includes a first servo head group 11, the data head group 12, and a second servo head group 13.

The first servo head group 11 includes a first servo head 11a, a second servo head 11b, and a third servo head 11c. The servo heads 11a to 11c are aligned in the width direction (the arrow Y direction) of the magnetic tape. The servo heads 11a to 11c are energized at the same time and they can read servo stripes formed on the magnetic tape. The servo heads 11a to 11c output servo signals on the basis of the read-out servo pattern. The servo signals outputted from the servo heads 11a to 11c are sent to a first preamplifier 2a, a second preamplifier 2b, and a third preamplifier 2c, respectively.

The data head group 12 includes 8 data heads. The data heads included in the data head group 12 can read a data pattern recorded on the magnetic tape and can form a data pattern on the magnetic tape. It should be noted that although the number of the data heads included in the data head group 12 is 8 in Embodiment 1, the number is an example. For example, the data head group 12 can include 16 data heads.

The second servo head group 13 can read servo stripes formed on the magnetic tape. Since the second servo head group 13 operates in the same manner as the first servo head group 11, the detailed description thereof will not be repeated.

It should be noted that a "plurality of servo heads (N servo heads, where N≧2)" in Embodiment 1 refer to heads that are disposed on the same bump and that can read a servo pattern from the same servo band. Therefore, a configuration in which one servo head is disposed on above and one servo head is disposed on below the data head 12 so as to interpose the data head 12 does not apply to the definition of the "plurality of servo heads" in Embodiment 1, even if the servo heads are disposed on the same bump. Further, a plurality of servo heads each of which is disposed on a different bump and does not read the same servo band also do not apply to the definition of the "plurality of servo heads" in Embodiment 1.

The preamplifiers 2a to 2c amplify the servo signals outputted from the servo heads 11a to 11c. The servo signals amplified by the preamplifiers 2a to 2c are sent to a first delay circuit 3a, a second delay circuit 3b, and a third delay circuit 3c, respectively.

The delay circuits 3a to 3c delay the servo signals sent from the preamplifiers 2a to 2c for a predetermined time. The delay time of the delay circuits 3a to 3c is controlled by a delay time control circuit 4. The delay time set by the delay time control circuit 4 is such a time that timings of the servo signals outputted respectively from the delay circuits 3a to 3c coincide with each other. The servo signals outputted from the delay circuits 3a to 3c are sent to an adder 5.

The adder 5 adds up the servo signals outputted from the delay circuits 3a to 3c. The servo signal added up by the adder 5 is sent to a signal processing circuit 6.

On the basis of the servo signal outputted from the adder 5, the signal processing circuit 6 generates a position error signal (PES) as tracking information.

For example, servo stripes in conformity with the LTO standard include, as shown in FIG. 2A, a first stripe group 21, a second stripe group 22, a third stripe group, and a fourth stripe group (the third and the fourth stripe groups are not shown). The first stripe group 21, the second stripe group 22, the third stripe group, and the fourth stripe group are formed in the longitudinal direction of the magnetic tape in that order. The first stripe group 21 is a stripe group that is inclined in a first direction with respect to the longitudinal direction of the magnetic tape. The second stripe group 22 is a stripe group that is inclined in a second direction, which is an opposite direction to the first direction. The third and the fourth stripe groups are formed subsequent to the second stripe group 22. The first stripe group 21 and the second stripe group 22 include 4 stripes, respectively. The third and the fourth stripe groups include 5 stripes, respectively. The first stripe group 21 and the third stripe group are inclined in the same direction at the same angle. The second stripe group 22 and the fourth stripe group are inclined in the same direction at the same angle.

In the servo stripes as described above, a PES can be calculated using the following Expression 1. In Expression 1, an angle Y is an angle of an inclination of the stripes (in Embodiment 1, Y=6°). A distance AB is a distance between an N-th stripe (N=1 to 4) in the first servo stripe group 21 and an N-th stripe (N=1 to 4) in the second servo stripe group 22 at the center in the width direction of the tape (in Embodiment 1, AB=50 μm). A distance AB1 is a distance between the stripes. A distance AC1 is a distance between a stripe A as an N-th stripe (N=1 to 4) in the first servo stripe group 21 and a stripe C as an N-th stripe (N=1 to 4) in the third servo stripe group.

$$PES = (AB - (AB1/AC1) \times 100)/2 \tan Y \quad \text{(Expression 1)}$$

On the basis of Expression 1, a PES is calculated every predetermined period. The calculated PES is converted into a driving current for driving the actuator (not shown) and is sent to the actuator. On the basis of the driving current, the actuator moves the head unit 1 in the width direction of the magnetic tape. It should be noted that since a tracking servo control method using a servo signal is well known in the art, the detailed description thereof will be omitted in the specification.

2. Reproduction Operation of Servo Signal

FIG. 2A is a schematic diagram showing the servo stripes formed on the magnetic tape. FIG. 2B shows a waveform of the servo signal reproduced by the first servo head 11a. FIG. 2C shows a waveform of the servo signal reproduced by the second servo head 11b. FIG. 2D shows a waveform of the servo signal reproduced by the third servo head 11c.

As shown in FIG. 1, the servo heads 11a to 11c included in the first servo head group 11 are aligned in the width direction of the tape. Therefore, in a case of reading the servo pattern formed with an inclination in the longitudinal direction of the tape as shown in FIG. 2A, the first servo head 11a traces a path A1, the second servo head 11b traces a path A2, and the third servo head 11c traces a path A3. Thus, given that the magnetic tape runs in the direction indicated by the arrow A, the third servo head 11c is the earliest servo head to reproduce a servo signal (see FIG. 2D). After a lapse of a time D1, the second servo head 11b reproduces a servo signal (see FIG. 2C). Furthermore, after a lapse of a time D2, the first servo head 11a reproduces a servo signal (see FIG. 2B). In this way, a time lag is developed between the servo signals outputted respectively from the servo heads 11a to 11c. It should be noted that when the running speed of the magnetic tape is constant, the time D1 and the time D2 are the same.

Next, the servo signals outputted from the servo heads 11a to 11c are inputted to the delay circuits 3a to 3c through the preamplifiers 2a to 2c, respectively. The delay circuits 3a to 3c output the servo signals outputted from the preamplifiers 2a to 2c after delaying the signals on the basis of the delay time set by the delay time control circuit 4. In Embodiment 1, the delay time control circuit 4 sets the delay time of the first delay circuit 3a to 0, the delay time of the second delay circuit 3b to a time D3, and the delay time of the third delay circuit 3c to a time D4. It should be noted that the times D1 to D4 fulfill the following relationships:

$$D1=D2=D3; \text{ and}$$

$$D4=D3\times2.$$

FIGS. 3A to 3C show the servo signals outputted from the delay circuits 3a to 3c, respectively. As shown in FIG. 3A, since the delay time of the first delay circuit 3a is 0, the servo signal outputted from the first delay signal circuit 3a has the same timing as the servo signal shown in FIG. 2B. As shown in FIG. 3B, since the servo signal outputted from the second delay circuit 3b is delayed for the time D3 from the servo signal shown in FIG. 2C, the signal has the same timing as the servo signal shown in FIG. 3A (the peaks of the waveforms coincide with each other). As shown in FIG. 3C, since the servo signal outputted from the third delay circuit 3c is delayed for the time D4 from the servo signal shown in FIG. 2D, the signal has the same timing as the servo signal shown in FIG. 3A (the peaks of the waveforms coincide with each other). In this way, by delaying the servo signals at the delay circuits 3a to 3c, a time lag between the servo signals outputted from the servo heads 11a to 11c is eliminated, and the peaks of the waveforms can be coincided with each other. The servo signals outputted from the delay circuits 3a to 3c are sent to the adder 5.

The adder 5 adds up the servo signals outputted from the delay circuits 3a to 3c (see FIGS. 3A to 3C) to generate a servo signal shown in FIG. 3D. As shown in FIG. 3D, since the servo signal outputted from the adder 5 is generated by adding up the servo signals shown in FIGS. 3A to 3C, its level is three times higher than that of any one of the servo signals shown in FIGS. 3A to 3C. The adder 5 increases the level of a servo signal 31 by 3 times. The servo signal 31 is a signal that is generated by the servo head reading the first stripe group 21. The servo signal outputted from the adder 5 is sent to the signal processing circuit 6.

The signal processing circuit 6 detects the peak of the servo signal outputted from the adder 5 by comparing the servo signal with a predetermined threshold level TH, and generates a pulse shown in FIG. 3E. Since the threshold level TH is set to a level that does not detect the peak of a servo signal 32 obtained by reading the second stripe group 22, the pulse shown in FIG. 3E is in sync only with the servo signal 31.

When the servo heads 11a to 11c read the second stripe group 22 (see FIG. 2A), the first servo head 11a is the earliest servo head to reproduce a servo signal (see FIG. 2B). After a lapse of a time D5, the second servo head 11b reproduces a servo signal (see FIG. 2C). Furthermore, after a lapse of a time D6, the third servo head 11c reproduces a servo signal (see FIG. 2D). In this way, a time lag is developed between the servo signals outputted respectively from the servo heads 11a to 11c. It should be noted that the time D5 and the time D6 are the same.

Next, the servo signals outputted from the servo heads 11a to 11c are inputted to the delay circuits 3a to 3c through the preamplifiers 2a to 2c, respectively. The delay circuits 3a to 3c output the servo signals outputted from the preamplifiers 2a to 2c after delaying the signals on the basis of the delay times set by the delay time control circuit 4. In Embodiment 1, the delay time control circuit 4 sets the delay time of the first delay circuit 3a to a time D7, the delay time of the second delay circuit 3b to a time D8, and the delay time of the third delay circuit 3c to 0. It should be noted that the times D5, D6, D7, and D8 fulfill the following relationships:

$$D5=D6=D8; \text{ and}$$

$$D7=D8\times2.$$

FIGS. 4A to 4C show servo signals outputted from the delay circuits 3a to 3c, respectively. As shown in FIG. 4A, since the servo signal outputted from the first delay circuit 3a is delayed for the time D7 from the servo signal shown in FIG. 2B, the signal has the same timing as the servo signal shown in FIG. 4C (the peaks of the waveforms coincide with each other). As shown in FIG. 4B, since the servo signal outputted from the second delay circuit 3b is delayed for the time D8 from the servo signal shown in FIG. 2C, the signal has the same timing as the servo signal shown in FIG. 4C (the peaks of the waveforms coincide with each other). Since the delay time of the third delay circuit 3c is 0, the servo signal shown in FIG. 4C has the same timing as the servo signal shown in FIG. 2D. In this way, by delaying the servo signals at the delay circuits 3a to 3c for a predetermined time, a time lag between the servo signals outputted from the servo heads 11a to 11c is eliminated, and the peaks of the waveforms of the servo signals can be coincided with each other. The servo signals outputted from the delay circuits 3a to 3c are sent to the adder 5.

The adder 5 adds up the servo signals outputted from the delay circuits 3a to 3c (see FIGS. 4A to 4C) to generate a servo signal shown in FIG. 4D. As shown in FIG. 4D, since the servo signal outputted from the adder 5 is generated by adding up the servo signals shown in FIGS. 4A to 4C, its level is three times higher than that of any one of the servo signals shown in FIGS. 4A to 4C. The adder 5 increases the level of a servo signal 42 by 3 times. The servo signal 42 is a signal generated by the servo head reading the first stripe group 22. The servo signal outputted from the adder 5 is sent to the signal processing circuit 6.

The signal processing circuit 6 detects the peak of the servo signal outputted from the adder 5 by comparing the servo signal with the predetermined threshold level TH, and generates a pulse shown in FIG. 4E. Since the threshold level TH is set to a level that does not detect the peak of a servo signal 41 obtained by reading the first stripe group 21, the pulse shown in FIG. 4E is in sync only with the servo signal 42.

On the basis of the pulse shown in FIG. 3E and the pulse shown in FIG. 4E, the signal processing circuit 6 calculates a PES by using Expression 1 described above.

Figure 5A:
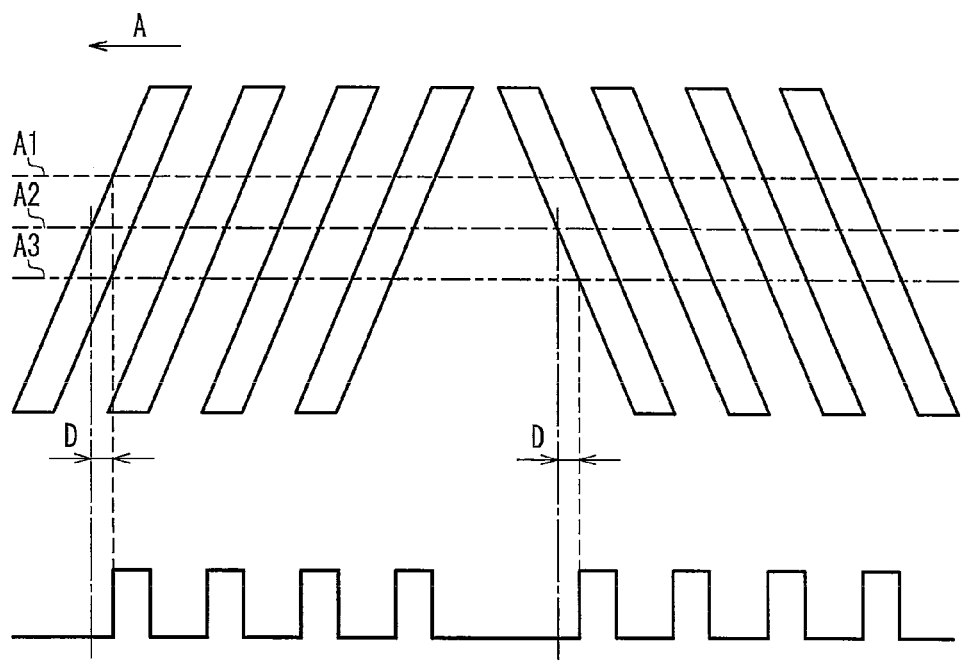
FIG. 5A is a schematic diagram showing servo stripes.
Figure 5B:
FIG. 5B is a waveform diagram showing a pulse outputted from the signal processing circuit.

FIG. 5A is a schematic diagram of the stripes shown in FIG. 2A. FIG. 5B is a timing chart in which the pulse shown in FIG. 3E and the pulse shown in FIG. 4E are merged. As shown in FIG. 5, the pulse obtained on the basis of the first stripe group 21 and the pulse obtained on the basis of the second stripe group 22 are respectively delayed for the time D from the timing of the servo signal reproduced by the second servo head 11b. Therefore, by determining the timings of these pulses, a PES can be calculated using Expression 1.

Next, a specific example of the arrangement of the servo heads 11a to 11c will be described.

Figure 6:
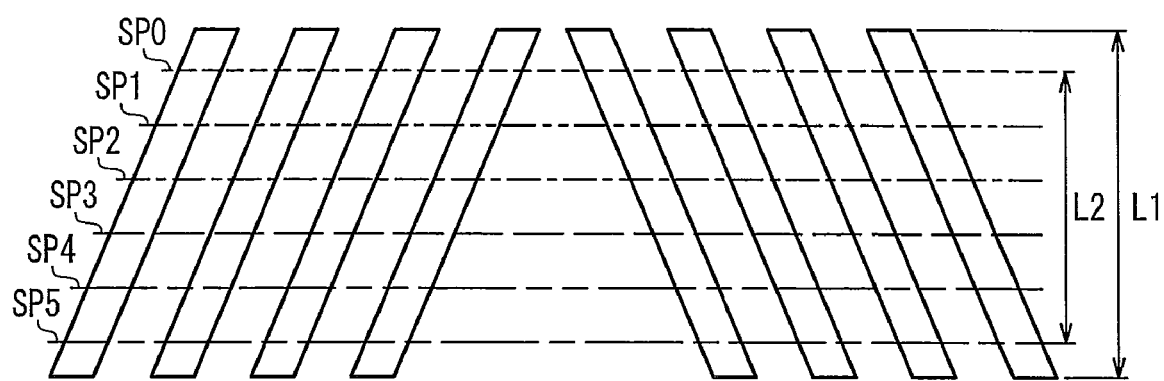
FIG. 6 is a schematic diagram showing a servo band for describing a spacing between the servo heads.

As shown in FIG. 6, in the case of the LTO 1 standard, a size L1 of the servo band in the width direction of the tape is about 186 μm. In such a servo band, there are 6 servo positions (servo positions SP0 to SP5; positions that are traced normally by the servo heads). Since a spacing L2 between the servo positions SP0 and SP5 is about 137.5 μm, a spacing between the servo position SP0 and the upper end of the servo band and a spacing between the servo position SP5 and the lower end of the servo band are about 24.25 μm, respectively. Thus, in a case where the number of servo heads provided is 3 as in Embodiment 1, by arranging the three servo heads at a spacing of about 20 μm, even when one of the three servo heads in the middle traces any one of the servo positions SP0 to SP5, the three servo heads can read the stripes in the same servo band. It should be noted that the spacing between the three servo heads (about 20 μm) is an example, and the spacing can be increased when the width L1 of the servo band becomes larger than 186 μm.

3. Effects of Embodiment, etc.

According to Embodiment 1, the information recording apparatus includes the three servo heads 11a to 11c. By delaying at the delay circuits 3a to 3c the servo signals outputted respectively from the servo heads 11a to 11c so that the peaks of the waveforms of the servo signals coincide with each other, and adding up the delayed servo signals at the adder 5, the output level of the servo signal can be increased by 3 times. Further, the S/N ratio can be increased by 43 times. As a result, the precision of a PES improves and the amount of off-track can be reduced.

Although the number N of the servo heads in Embodiment 1 is 3, the number can be set arbitrarily as long as N≧2. However, the servo heads need to be capable of tracing the same servo band.

In Embodiment 1, the servo signals (analog signals) reproduced by the servo heads 11 are delayed at the delay circuits 3a to 3c, and they are added up at the adder 5. However, an analog-to-digital converter can be used in place of the delay circuits 3a to 3c and the adder 5. That is, an A/D converter converts the servo signals reproduced by the servo heads into digital data and outputs the data to the signal processing circuit. The signal processing circuit generates a PES (tracking information) on the basis of the digital data outputted from the A/D converter.

The delay circuits 3a to 3c in Embodiment 1 are an example of the delay means of the present invention. The adder 5 in Embodiment 1 is an example of the adding means of the present invention. The signal processing circuit 6 in Embodiment 1 is an example of the signal processing means of the present invention.

Embodiment 2

1. Configuration of Information Recording Apparatus

Figure 7:
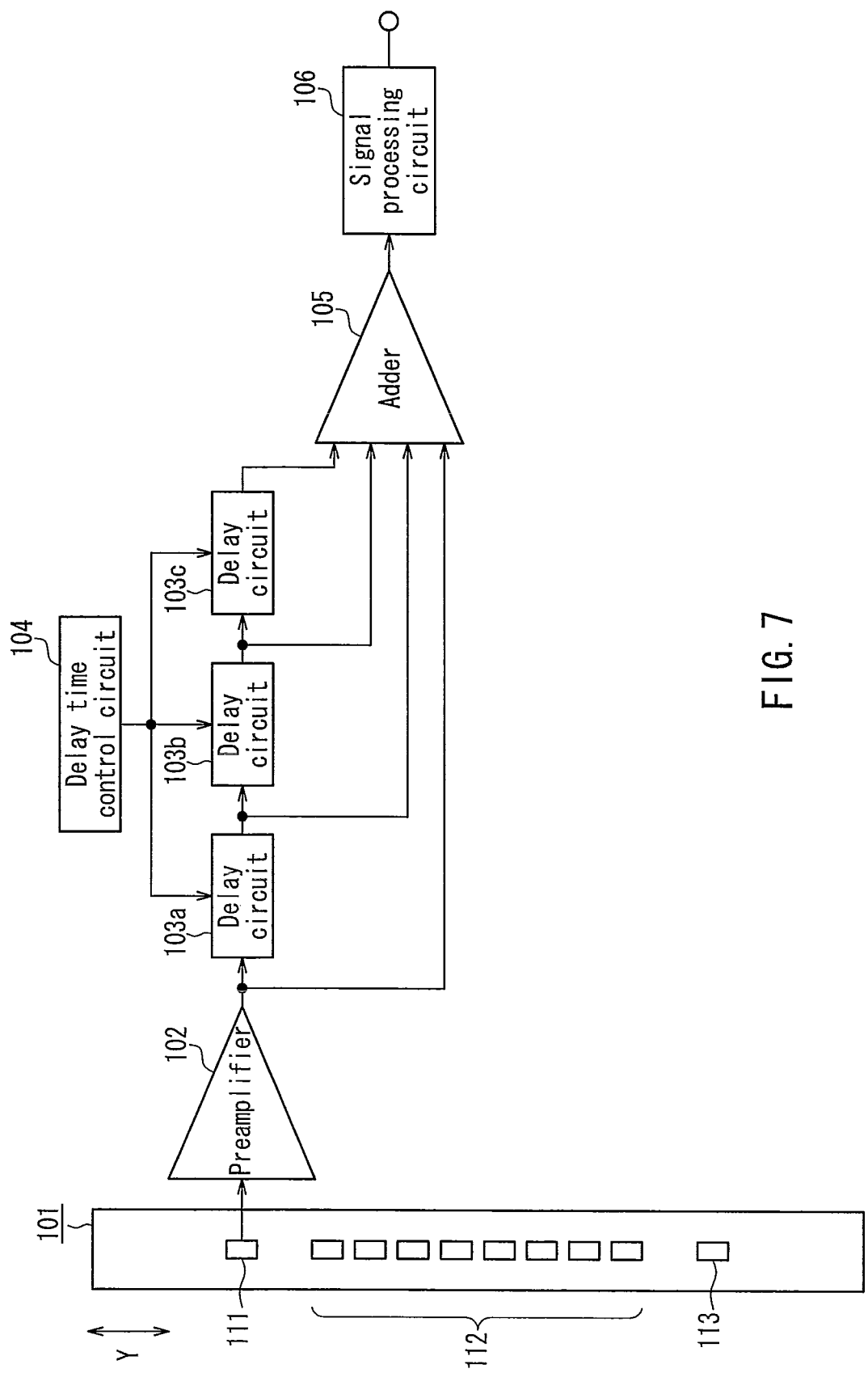
FIG. 7 is a block diagram showing an information recording apparatus according to Embodiment 2.

FIG. 7 is a block diagram showing an information recording apparatus according to Embodiment 2.

In FIG. 7, a head unit 101 is disposed so that it can be moved by an actuator (not shown) in a width direction (the arrow Y direction) of magnetic tape. When carrying out tracking servo control on the magnetic tape, the head unit 101 is controlled to move in the width direction (the arrow Y direction) of the magnetic tape so that data heads included in a data head group 112 can trace a predetermined data track. The head unit 101 includes a first servo head 111, the data head group 112, and a second servo head 113.

The first servo head 111 reads a servo pattern recorded on the magnetic tape and outputs a servo signal on the basis of the read-out servo pattern. The servo signal outputted from the first servo head 111 is sent to a preamplifier 102.

The data head group 112 includes 8 data heads. The data heads included in the data head group 112 can read a data pattern recorded on the magnetic tape and form a data pattern on the magnetic tape. It should be noted that although the number of the data heads included in the data head group 112 is 8, this number is an example. For example, the data head group 112 can include 16 data heads.

The second servo head 113 can read a servo pattern recorded on the magnetic tape. Since the second servo head 113 operates in the same manner as the servo head 111, the detailed description thereof will not be repeated.

The preamplifier 102 amplifies the servo signal outputted from the servo head 111. The servo signal outputted from the preamplifier 102 is sent to a first delay circuit 103a and an adder 105.

The delay circuits 103a to 103c are connected to each other in series. The first delay circuit 103a outputs the servo signal sent from the preamplifier 102 after delaying the signal for the time D. The servo signal outputted from the first delay circuit 103a is sent to the second delay circuit 103b and the adder 105. The second delay circuit 103b outputs the servo signal outputted from the first delay circuit 103a after delaying the signal for the time D. The servo signal outputted from the second delay circuit 103b is sent to the third delay circuit 103c and the adder 105. The third delay circuit 103c outputs the servo signal outputted from the second delay circuit 103a after delaying the signal for the time D. The servo signal outputted from the third delay circuit 103c is sent to the adder 105. The delay time D of the delay circuits 103a to 103c is set by a delay time control circuit 104.

The delay time control circuit 104 can calculate the delay time D on the basis of the following Expression 2. In Expression 2, a spacing W is a spacing between servo stripes formed on the magnetic tape. Speed V is the transport speed of the magnetic tape.

$$D = W/V \qquad \text{(Expression 2)}$$

The adder 105 adds up the servo signals outputted respectively from the preamplifier 102 and the delay circuits 103a to 103c. The servo signal added up by the adder 105 is sent to a signal processing circuit 106.

The signal processing circuit 106 generates a PES as tracking information on the basis of the servo signal outputted from the adder 5. A method of generating a PES will be described later.

2. Reproduction Operation of Servo Signal

FIG. 8A is a schematic diagram showing servo stripes formed on the magnetic tape. As shown in FIG. 8A, the servo stripes in conformity with the LTO standard include a first stripe group 121, a second stripe group 122, a third stripe group 123, and a fourth stripe group 124. The first stripe group 121 includes stripes C11 to C14 that are inclined in a first direction with respect to the longitudinal direction of the magnetic tape. The second stripe group 122 includes stripes D11 to D14 that are inclined in a second direction, which is an opposite direction to the first direction. The third stripe group 123 includes stripes A11 to A15 that are inclined in the first direction. The fourth stripe group 124 includes stripes B11 to B15 that are inclined in the second direction (the stripes B12 to B15 are not shown). The first stripe group 121 and the second stripe group 122 include four stripes, respectively. The third stripe group 123 and the fourth stripe group 124 include five stripes, respectively. The first stripe group 121 and the third stripe group 123 are inclined in the same direction at the same angle. The second stripe group 122 and the fourth stripe group 124 are inclined in the same direction at the same angle.

FIG. 8B shows a waveform of the servo signal reproduced by the first servo head 111. FIG. 8C shows a waveform of the servo signal outputted from the first delay circuit 103a. FIG. 8D shows a waveform of the servo signal outputted from the second delay circuit 103b. FIG. 8E shows a waveform of the servo signal outputted from the third delay circuit 103c. The servo signals shown in FIGS. 8B to 8E are obtained when the first servo head 111 traces a dashed line L12 in FIG. 8A. There is a time lag of the time D between the servo signals shown in FIGS. 8B and 8C. There is a time lag of the time D between the servo signals shown in FIGS. 8C and 8D. There is a time lag of the time D between the servo signals shown in FIGS. 8D and 8E. FIG. 8F shows a waveform of the servo signal outputted from the adder 105.

The servo signal (see FIG. 8B) reproduced by the first servo head 111 is inputted to the first delay circuit 103a and the adder 105 through the preamplifier 102. The first delay circuit 103a outputs the servo signal outputted from the preamplifier 102 after delaying the signal on the basis of the delay time D set by the delay time control circuit 104. The servo signal (see FIG. 8C) outputted from the first delay circuit 103a is inputted to the second delay circuit 103b and the adder 105. The second delay circuit 103b outputs the servo signal outputted from the first delay circuit 103a after delaying the signal on the basis of the delay time D set by the delay time control circuit 104. The servo signal (see FIG. 8D) outputted from the second delay circuit 103b is inputted to the third delay circuit 103c and the adder 105. The third delay circuit 103c outputs the servo signal outputted from the second delay circuit 103b to the adder 105 after delaying the signal on the basis of the delay time D set by the delay time control circuit 104. Therefore, the four servo signals shown in FIGS. 8B to 8E are inputted to the adder 105.

The adder 105 adds up the servo signals shown in FIGS. 8B to 8E, and generates the servo signal shown in FIG. 8F. As shown in FIG. 8F, the level of the servo signal outputted from the adder 105 becomes the highest at timings T11, T12, and T13 at which the first servo head 111 reads an M-th stripe (M=1 to 4) in each stripe group. The level of the servo signal at these timings becomes about 4 times higher than those of the servo signals shown in FIGS. 8B to 8E. It should be noted that, in Embodiment 2, M=4. That is, the stripes read by the first servo head 111 are the stripes C14, D14, and A14.

The signal processing circuit 106 calculates a PES on the basis of the servo signal outputted from the adder 105.

Specifically, the signal processing circuit 106 detects the peak of the servo signal (see FIG. 8F) outputted from the adder 105 by comparing the servo signal with a reference value having the predetermined threshold level TH, and generates a pulse (a pulse that is in sync with the timings T11, T12, and T13) that is in sync with a servo signal that exceeded the threshold level TH.

Next, the signal processing circuit 106 calculates a PES on the basis of the following Expression 3. In Expression 3, an angle Y is an angle of an inclination of the stripes, and in Embodiment 2, Y=6°. A distance CD1 is a distance between an N-th stripe (N=1 to 4) in the first servo stripe group 121 and an N-th stripe (N=1 to 4) in the second servo stripe group 122 at the center in the width direction of the servo stripes (an alternate long and short dash line L11). In Embodiment 2 (LTO standard), the distance CD1 is set to 50 µm. A distance CD2 is a distance between an N-th stripe (N=1 to 4) in the first stripe group 121 and an N-th stripe (N=1 to 4) in the second stripe group 122 at a servo head position. The distance CD2 changes according to where the servo head is on the servo stripes. The distance CD2 is a distance between, for example, the stripes C14 and D14 on the dashed line L12 in FIG. 8. A distance CA is a distance between an N-th stripe (N=1 to 4) in the first stripe group 121 and an N-th stripe (N=1 to 4) in the third stripe group 123. It should be noted that the distances CD1, CD2, and CA are determined from the pulse generated by the signal processing circuit 106 based on the servo signal.

$$PES=(CD1-(CD2/CA)\times 100)/2 \tan Y \quad \text{(Expression 3)}$$

On the basis of Expression 3, a PES is calculated every predetermined period. The calculated PES is converted into a driving current for driving the actuator (not shown), and is sent to the actuator. The actuator moves the head unit 101 in the width direction (the arrow Y direction in FIG. 1) of the magnetic tape on the basis of the driving current. Since a tracking servo control method using a servo signal is well known in the art, the detailed description thereof will be omitted in the specification.

In a case where there is lateral tape motion (LTM) in the magnetic tape, the position of the magnetic tape changes in its width direction with respect to the head unit 101 when the magnetic tape is moving. FIG. 9A is a schematic diagram showing servo stripes formed on the magnetic tape. A line R in FIG. 9 is a scanning path of the servo head when there is LTM in the magnetic tape. In reality, the magnetic tape moves in the width direction when there is LTM in the magnetic tape. However, in the figure, the scanning path of the servo head is assumed to move in the width direction of the magnetic tape for the purpose of convenience in explanation.

As shown in FIG. 9A, when there is LTM having a wavelength shorter than the servo frame (200 µm), the head unit 101 cannot track positional changes of the magnetic tape in the width direction even if tracking servo control is carried out. As a result, the servo heads scan the servo band diagonally. When the servo heads scan the servo band in this manner, the peak positions of the servo signals shown in FIGS. 9B to 9E deviate from each other. Thus, as shown in FIG. 9F, the waveform of the servo signal outputted from the adder 105 is distorted, and thereby the distance between an N-th servo stripe (N=1 to 4) in the first servo stripe group 121 and an N-th servo stripe (N=1 to 4) in the second servo stripe group 122 may not be determined. However, since the deviation in the peak positions is normally not significant, a PES calculated by the signal processing circuit 106 also does not depart significantly from a correct value.

3. Effects of Embodiment, etc.

According to Embodiment 2, by delaying the peaks of the waveforms of the servo signals outputted from the first servo head 111 at the delay circuits 103a to 103c for a predetermined time, and adding up the delayed servo signals at the adder 105, the output level of the servo signal can be increased by 4 times. Further, the S/N ratio can be increased by two times (√4 times). Thus, the precision of PES improves and the amount of off-track can be reduced. That is, when delaying and adding up servo signals by using N delay circuits, the output level of the servo signals increases by (N+1) times, and the S/N ratio increases by √(N+1) times. Thus, the precision of PES improves and the amount of off-track can be reduced.

Although the number N of the delay circuits in Embodiment 2 is "3", the number can be arbitrarily determined as long as N≧2. However, when the number of stripes included in a servo stripe group is M, the following expression needs to be fulfilled.

$$N=M-1 \quad \text{(Expression 4)}$$

When servo stripe groups having different numbers of stripes are mixed as in a servo pattern that is in conformity with the LTO standard, the smallest number is used for the number M of the stripes. "When servo stripe groups having different numbers of stripes are mixed" refers to a case where there are a servo stripe group including 4 stripes and a servo stripe group including 5 stripes.

In Embodiment 2, although analog signal processing is carried out by delaying with the delay circuits 103a to 103c servo signals (analog signals) reproduced by the servo head 111 and adding up the signals with the adder 105, a digital signal processing may be carried out. That is, an analog-to-digital converter, a delay memory, and a digital-to-analog converter may be provided, and the signal processing circuit may generate tracking information (PES) on the basis of a servo signal generated by the digital-to-analog converter. The analog-to-digital converter can convert a servo signal (an analog signal) read by the servo head into digital data. After delaying columns in the digital data for a predetermined time, the delay memory can add up the delayed columns and the original columns of the digital data. The digital-to-analog converter can convert the added-up data columns into a servo signal (an analog signal).

The delay circuits 103a to 103c in Embodiment 2 are an example of the delay means of the present invention. The adder 105 in Embodiment 2 is an example of the adding means of the present invention. The signal processing circuit 106 in Embodiment 2 is an example of the signal processing means of the present invention.

The information recording apparatus of the present invention is useful for an apparatus that carries out tracking servo using a timing-based servo system.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information recording apparatus capable of carrying out tracking servo control by reading with a servo head servo stripes recorded on magnetic tape with an inclination in a longitudinal direction of the magnetic tape, the information recording apparatus comprising:
   two servo head groups each provided on both sides of a data head group, each of the servo head groups being composed of N servo heads (N≧2),
   the N servo heads aligned in a width direction of the magnetic tape;
   a delay means for delaying N servo signals reproduced by the N servo heads for a predetermined time;
   an adding means for adding up N servo signals outputted from the delay means;
   a signal processing means for generating tracking information from a servo signal outputted from the adding means; and
   a delay time control means for controlling a delay time of the delay means,
   wherein the delay time control means controls the delay time of the delay means so that peak timings of N servo signals with a time lag reproduced by the N servo heads coincide with each other.

2. An information recording apparatus capable of carrying out tracking servo control by reading with a servo head servo stripes recorded on magnetic tape with an inclination in a longitudinal direction of the magnetic tape, the information recording apparatus comprising:
   N delay means for delaying a servo signal reproduced by the servo head for a predetermined time, the N delay means being connected to each other in series;
   an adding means for adding up a servo signal reproduced by the servo head and N servo signals outputted respectively from the N delay means;
   a signal processing means for generating tracking information from a servo signal outputted from the adding means; and
   a delay time control means for controlling a delay time of each of the delay means,
   wherein the delay time control means controls the delay time of each of the N delay means so that the delay time coincides with a period of the servo stripes.

* * * * *